S. McGEE.
Hubs for Vehicles.
No. 135,570.  Patented Feb. 4, 1873.
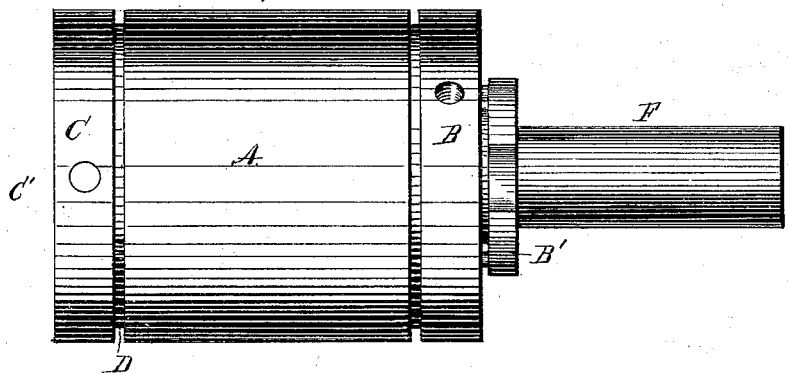
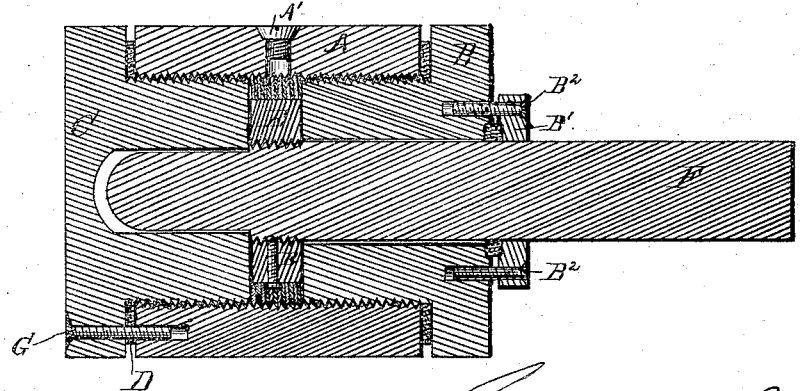

UNITED STATES PATENT OFFICE.

SAMUEL McGEE, OF MADISON, ASSIGNOR OF ONE-FOURTH HIS RIGHT TO JAMES S. ADAMS AND FRANCIS H. FAIRCHILD, OF MORRISTOWN, N. J.

IMPROVEMENT IN HUBS FOR VEHICLES.

Specification forming part of Letters Patent No. 135,570, dated February 4, 1873.

*To all whom it may concern:*

Be it known that I, SAMUEL McGEE, residing at Madison, in the county of Morris and State of New Jersey, have invented certain new and useful Improvements in Running-Gear, of which the following is a specification:

Figure 1 is an elevation of my improvement, showing the central portion or oil-reservoir, the packing, and the caps which are screwed into the oil-reservoir; and Fig. 2 is a central sectional elevation, showing the parts above referred to, the shaft or axle in position, the devices for preventing the oil from working out around the axle, and the aperture through which the lubricating material is inserted.

Corresponding letters refer to corresponding parts in both of the figures.

This invention relates to a device which is designed to constitute a portion of the running-gear of railroad cars and carriages, but which is also applicable to all kinds of shafting which have stationary boxes, and in which it is desirable to prevent the endwise movement of the shaft; and it consists in the construction, combination, and arrangement of the parts of which it is composed, as will be more fully explained hereinafter.

In constructing devices of this character I use a cylinder, A, of metal, which is to be of sufficient length and thickness to admit of there being screwed into its ends two caps, B and C, the one marked C having, in that portion of it which enters the cylinder A, a recess, which forms a bearing for the outer end of a shaft or axle, its outer end being closed, and of sufficient diameter to cause its periphery to be about flush with that of said cylinder. Upon the outer surface of that portion of this cap which enters the cylinder A there is formed a screw-thread, which fits neatly into a female thread formed in said cylinder. This nicely-fitting thread will generally prevent the escape of any oil from the oil-chamber (now to be described) at that point; but to still further guard against such escape, there is inserted a ring of packing, D, between the flange of cap C and the end of cylinder A, which effectually closes the joint and precludes the possibility of any leakage. In order that this cap may be screwed into and out of the cylinder A, holes C' are drilled into the periphery of the flange, into which a rod or the end of a wrench may be inserted for that purpose, or the flange may be made square, or of other suitable form for the reception of a wrench with which it may be turned. The cap B is in all respects like C, except that it has an aperture all the way through it for the passage of the shaft or axle, and has a stuffing-box or collar, $B^1$, screwed to it between, which and cap B there is placed some suitable kind of packing, such as vulcanized rubber, leather, or some other elastic material which, when suitably compressed by the screws $B^2$, will effectually prevent the leakage of any oil around the shaft or axle at that point; and as there is a ring of packing between the flange of this cap and the end of cylinder A, which it enters, it follows that no oil can at any time escape from the chamber A, except when it is drawn off through the closed induction aperture $A^1$, which is shown as being closed by a screw, which may be removed for that purpose. When, however, this device is used for an oil-box for railroad cars, and the cylinder A has had its form changed so as to cause it to fit the jaws of the trucks, and it is desirable to draw off the oil from the chamber, the outer cap C may be removed for that purpose. By reference to Fig. 2 of the drawing it will be seen that the projections upon the caps B and C are not of sufficient length to cause their ends to meet within the cylinder A, and that, as a consequence, a space is left between them for the reception of a collar, E, which is screwed upon a shaft, F, now to be described. As this collar is not of sufficient diameter to fill the space within the cylinder, it follows that a chamber will be left all around said collar, which chamber, when the device is in use, is to be filled with oil or some other lubricating material, which can be inserted through the aperture A', as above described. The shaft or axle F may be of steel or any other suitable metal, its inner end being made to fit the recess formed in cap A', while another portion thereof is made to fit neatly the hole formed through cap B for its passage; and, in order that the endwise movement of this shaft within the cylinder or box A may be prevented, that portion of it which is within the chamber, or between the end of cap B and C, is provided with a screw-thread, upon which the collar E is screwed, which may be prevented from unscrewing by a screw, as shown in Fig. 2. This collar, coming as it does between the ends of the projections upon caps C and B, effectually prevents any end traverse of the shaft or axle, more than what is necessary to allow the lubricating material to pass inward around the collar and to the other portions of the axle. The combination of these caps with the collar upon the shaft serve another and important function, which is, that in cases where a certain amount of endwise movement of the shaft within the chamber, or of the chamber upon the axle, is necessary, the caps may be so adjusted as to give just the amount of movement required, and then be secured in their proper positions by means of screws G, one of which is shown in Fig. 2.

From the foregoing it will be seen that this device is applicable not only to railroad cars and to carriages, but to all kinds of machinery in which it is desirable to use a rotating shaft or a rotating pulley or wheel, which shall have in it an oil-box, from which the oil cannot escape, the only modification required in it to adapt it to the different uses being ones of form, and not of function.

When it is to be used as a carriage-wheel, the cylinder A is to be made of sufficient diameter to allow it to receive and support the spokes of the wheel. When it is to be used in cars, the form of the part marked A is to be changed so as to cause it to fit the jaws of the trucks, and when it is to be used on the end of a rotating shaft it is to be of any form required; but when it is to be used as a part of a pulley or wheel which rotates upon a shaft, both of the caps are to be made like the one marked B.

Having thus described my invention, what I claim, and desire to secure by Letters Patent, is—

1. An oil-box or reservoir combining in its construction a central section, A, threaded-end sections B and C, a nearly central oil-chamber, and a packing-box or collar, B', the parts being constructed and arranged substantially as and for the purpose set forth.

2. The combination of the cylinder A, caps B and C, and collared shaft F, the parts being arranged for regulating the end traverse of the axles, substantially as and for the purpose set forth.

In testimony whereof I have signed my name to this specification in the presence of two subscribing witnesses.

SAMUEL McGEE.

Witnesses:
WILMER BRADFORD,
B. EDW. J. EILS.